J. KOHN.
MOLD FOR ARTIFICIAL TEETH.
APPLICATION FILED APR. 10, 1912.
1,031,855.
Patented July 9, 1912.
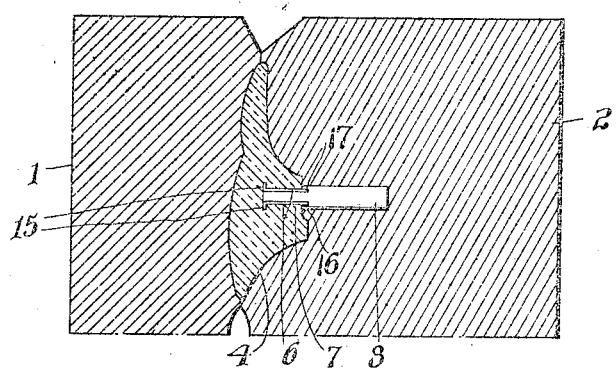
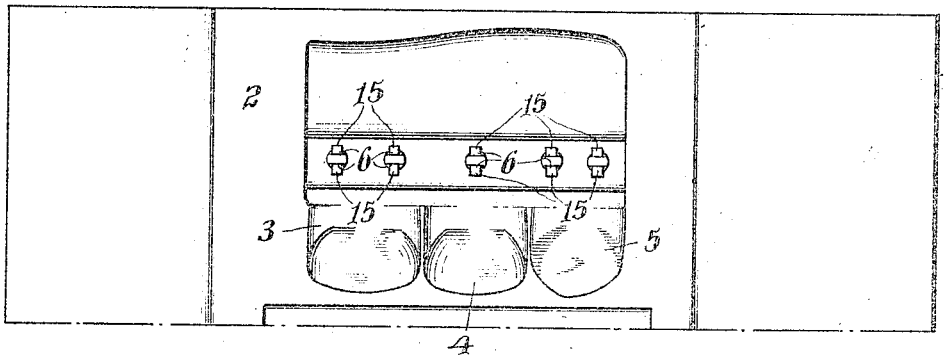
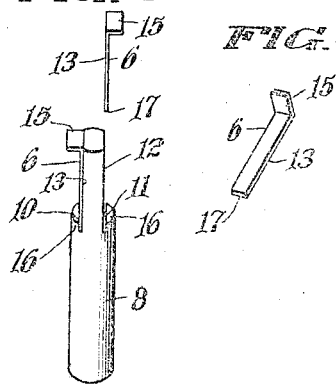 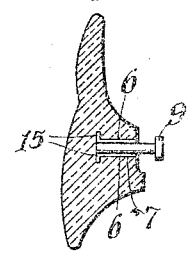 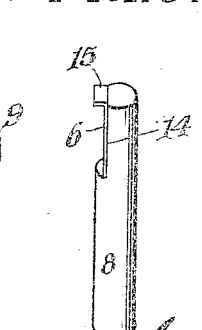 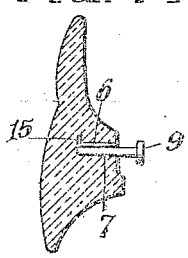
WITNESSES
INVENTOR
Joseph Kohn
BY
ATTORNEY

UNITED STATES PATENT OFFICE.

JOSEPH KOHN, OF PHILADELPHIA, PENNSYLVANIA.

MOLD FOR ARTIFICIAL TEETH.

1,031,855.

Specification of Letters Patent.   Patented July 9, 1912.

Application filed April 10, 1912.  Serial No. 689,768.

*To all whom it may concern:*

Be it known that I, JOSEPH KOHN, a citizen of the United States, residing at 3404 Market street, Philadelphia, in the county of Philadelphia and State of Pennsylvania, have invented a certain new and useful Mold for Artificial Teeth, of which the following is a specification.

The purpose of my invention is to provide means for inserting a refractory liner within a portion only of the side of a tooth cavity during the molding of the tooth, preferably anchoring one end within the tooth.

A further purpose of my invention is to provide temporary lateral support throughout substantially its entire length, for a longitudinally extending liner for the side of a tooth cavity, leaving a liner face exposed for pin engagement.

I have preferred to illustrate my invention by forms thereof, which I have found to be simple, inexpensive and effective, and which at the same time well illustrate the principles of my invention.

Figure 1 is a transverse section of the parts of a tooth mold with a tooth, two liners and their post support in place. Fig. 2 is a plan view of the bottom part of the mold shown in Fig. 1, adapted for units of three teeth, with posts and liners in place. Fig. 3 is a perspective of one form of post showing one liner in position and another about to be put in place. Fig. 4 is a perspective of my preferred form of liner. Fig. 5 is a transverse longitudinal section through a tooth and two liners of a shorter form, with a pin soldered to the liners. Fig. 6 is a perspective of a post supporting a single short liner only. Fig. 7 is a transverse longitudinal section of a tooth having a single liner within it and the pin soldered to the liner.

In order to increase the soldering surface of refractory material within a tooth cavity and extend it over the entire length of the cavity without excessive use of platinum, I find it desirable to line a side or a part of a side of a cavity substantially throughout its depth. I show the upper and lower mold parts 1 and 2 with recesses in the lower for teeth at 3, 4 and 5, to form a single unit or group. I support one or more liners 6, shown in Fig. 1, within a cavity 7, by means of a post 8 to provide for ultimate insertion and soldering of a pin 9 (Fig. 5), so that the pin can be soldered to the liner throughout the length of the cavity. The post holds the liner or liners, supports them laterally during the molding operation, and cores the cavity to the size and shape of the relatively inexpensive pin which is to be inserted finally. I prefer to slot the post 9, as at 10 and 11 for insertion of the outer ends of the liners 6, 6. I form the end of the post 8 with a contour conforming to that of the liner or liners, where they are to be supported, preferably with a flat or with flats upon the side or sides as at 12, against which the face or faces 13 of the liner ultimately to be exposed for soldering purposes rest. The remainder of the contour of the post conforms to that of the pin to be used. Preferably, the inner sides of the slots or kerfs 10 and 11 aline with the flattened surfaces of the post so that their inner sides constitute extensions thereof.

The kerfs or slots 10 and 11 are most useful when they have parallel sides so that the liner or liners may fit fairly snugly therein and be prevented from swinging movement away from the flattened side face or faces, of the post. Obviously, other means of preventing this swinging movement might be used, and, in the form shown in Fig. 6, I omit the slots and rely upon an adhesive to retain the liner in position, though not so tenaciously as to prevent ready withdrawal of the post after molding. I prefer to use a soft wax as at 14. Upon the inner end of the liner, I provide an anchorage to extend into the tooth body, preferably as a flange extending away from the post at an angle to the flat of the liner as illustrated at 15. It holds the inner end of the liner in fixed position at the inner end of the cavity. The slotting or kerfing of the post, leaves relative projections 16 which, when the molding is completed, throws the ends 17 of the liner, into relief, *i. e.* leave them exposed. They give additional soldering surface where the ends 17 extend beyond the tooth.

In the form shown in Figs. 5 and 7, which differ in the number of liners provided, the ends of the liner, are not extended beyond the surface of the tooth. In producing these teeth, the kerfing at 10 and 11 is not required since the wax holds the liners against the correspondingly shaped faces of the post during the molding operations.

Where but a single liner is to be used, I prefer to have one side of the post only conform to the liner shape, as will be clear from Fig. 6, in which figure, also, the kerfing or slotting of the post is omitted and the liner 6 is held against the flattened post surface by adhesion alone.

Having thus described my invention, what I claim as new and desire to secure by Letters Patent is:—

1. In a device of the character stated, top and bottom mold parts and a post fixed in the bottom mold part, projecting into the tooth space and flattened upon one side of the projecting part in combination with a liner supported against said flattened side.

2. In a device of the character stated, top and bottom mold parts, a post projecting from one of the parts and flattened upon one side in combination with a liner supported against the flattened surface and terminating in an anchor.

3. In a device of the character stated, top and bottom mold parts, a post secured in one of the parts, projecting therefrom, flattened upon one side of the projection and slotted in proximity to the flattened side, in combination with a cavity liner with one end resting in the slot of the pin.

4. In a device of the character stated, coöperating mold parts, a non-circular post supported in one part, in combination with a cavity liner supported against the side of the post and conforming to the shape of the post.

JOSEPH KOHN.

Witnesses:
Thos. D. Mowlds,
Helen I. Kauffman.